(12) United States Patent
Davis et al.

(10) Patent No.: US 6,717,911 B1
(45) Date of Patent: Apr. 6, 2004

(54) TELECOMMUNICATIONS SWITCHING CIRCUIT USING TRI-STATE BUFFERS

(75) Inventors: Roy Jaescentt Davis, Rowlett, TX (US); Hanan Fakhry Fouad, Plano, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/464,878

(22) Filed: Dec. 16, 1999

(51) Int. Cl.$^7$ .......................... G01R 31/08; H04L 12/28; H04L 12/50
(52) U.S. Cl. ..................... 370/230; 370/257; 370/360; 327/100
(58) Field of Search .................. 370/230, 257, 370/231, 465, 412, 360; 326/56; 327/185, 100; 379/291, 292, 93.09, 93.05

(56) References Cited

U.S. PATENT DOCUMENTS 3,889,109 A * 6/1975 Blessin ................ 235/153 AK
4,600,813 A * 7/1986 Pilling .................... 179/18 FC
5,953,395 A * 9/1999 Park ........................ 379/93.09

* cited by examiner

*Primary Examiner*—Duc Ho

(57) ABSTRACT

A telecommunications system having a controller, a local terminal, and a modem, a switch includes a first buffer having an input and an output. The input of the first buffer is connected to the controller, and the output is connected to the local terminal. The switch includes a second buffer having an input and an output. The input of the second buffer is connected to the controller. The output of the second buffer is connected to the modem. Each of the buffers has an enabled state and a disabled state. The buffers are connected to the local terminal to receive an enable signal. When the first buffer is in the enable state and the second buffer is in the disabled state, the first buffer provides a communication path from the controller to the local terminal. When the first buffer is in the disabled state and the second buffer is in the enabled state, the second buffer provides a communication path from the controller to the modem.

9 Claims, 1 Drawing Sheet

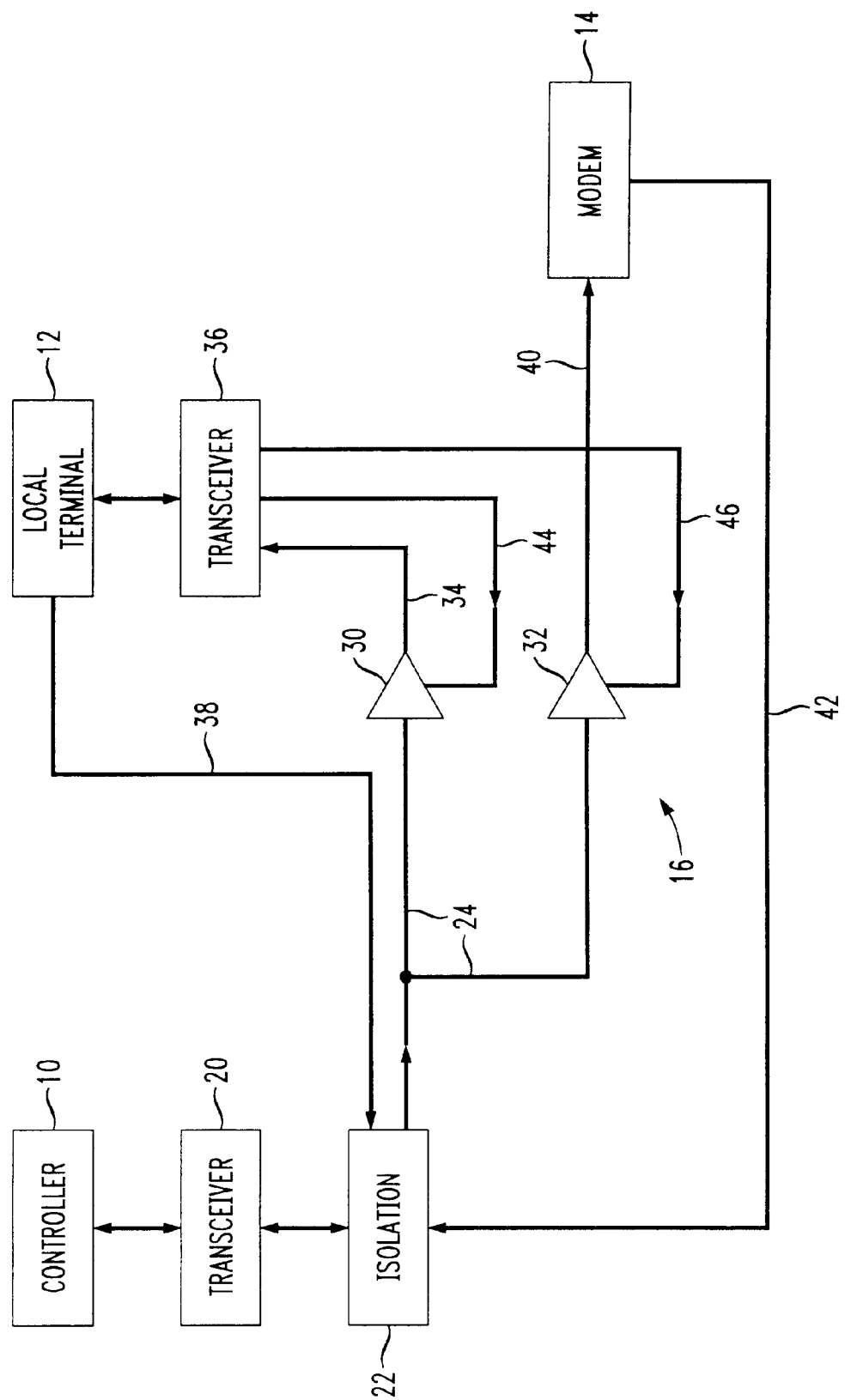

TELECOMMUNICATIONS SWITCHING CIRCUIT USING TRI-STATE BUFFERS

BACKGROUND OF THE INVENTION

Telecommunications systems include a power plant having rectifiers for converting AC power to DC power for operating equipment. Associated with the power plant system is a controller for monitoring the rectifiers. The controller also communicates with local terminals as well as remote users via telephone line through a modem module. The operational status of the power plant may be communicated by the controller to either the local terminal or the remote users. A switching function is therefore needed to control communications between the controller, local terminal, or modem.

Such a switching function has been provided by mechanical relays in which contact closures create a communications path between the controller and local terminal or modem. However, mechanical relays exhibit several deficiencies in operation, particularly in a telecommunications environment. Relays utilize a large amount of current, are slow in operation, and are a source of mechanical failure, becoming "stuck" in an on or off position. Additionally, relays are relatively large in size, occupying a large area on a printed wiring board. Further, relays are generally expensive.

A need has thus arisen for a switching circuit for allowing a controller to communicate with a local terminal or modem that has low current consumption, switches at high speeds, and switches with low noise. Additionally, a need has arisen for a switching circuit that requires minimal space on a printed wiring board and which is cost effective.

SUMMARY OF THE INVENTION

In accordance with the present invention, in a telecommunications system having a controller, a local terminal, and a modem, a switch is provided. The switch includes a first buffer having an input and an output. The input of the first buffer is connected to the controller, and the output is connected to the local terminal. The switch includes a second buffer having an input and an output. The input of the second buffer is connected to the controller. The output of the second buffer is connected to the modem. Each of the buffers has an enabled state and a disabled state. The buffers are connected to the local terminal to receive an enable signal. When the first buffer is in the enable state and the second buffer is in the disabled state, the first buffer provides a communication path from the controller to the local terminal. When the first buffer is in the disabled state and the second buffer is in the enabled state, the second buffer provides a communication path from the controller to the modem.

BRIEF DESCRIPTION OF THE DRAWINGS

For a more complete understanding of the present invention and for further advantages thereof, reference is now made to the following Description of the Preferred Embodiments taken in conjunction with the accompanying Drawing which is a block diagram of the present switching circuit.

DESCRIPTION OF THE PREFERRED EMBODIMENTS

Referring to the FIGURE, a telecommunications system utilizing the present switching circuit is illustrated. The telecommunications system includes a controller 10 which, among other things, provides a function of monitoring rectifiers within a power plant system of the telecommunications system. Controller 10 communicates with a local terminal 12 as well as remote users via a modem 14. The present invention utilizes a switching circuit, generally identified by the numeral 16 for providing a communication path between controller 10 and local terminal 12 and between controller 10 and modem 14.

Controller 10 may generate, for example, RS232 signals having voltage levels of, for example, ranging from −15 volts to +15 volts. The output of controller 10 is applied to a transceiver 20 which functions to shift voltage levels between RS232 voltage levels and TTL voltage signals such as, for example, 0 volts to 5 volts. Transceiver 20 also functions to shift TTL voltage levels to RS232 voltage levels. The output of transceiver 20 is applied to an isolation circuit 22 which functions to provide ground isolation between controller 10 and local terminal 12 and modem 14. Isolation circuit 22 provides an interface since ground reference voltages may differ between controller 10 and local terminal 12 and modem 14. The output of isolation circuit 22 representing a TTL voltage level applied via signal line 24 to switch 16. Switch 16 comprises a first tri-state buffer 30 and a second tri-state buffer 32, and may comprise, for example, a model MC 74HC125 manufactured and sold by Motorola, Inc.

The output of isolation circuit 22 is applied to the input of each buffer 30 and 32. The output of tri-state buffer 30 is applied via signal line 34 to a transceiver 36. Transceiver 36 functions to shift TTL voltage levels to RS232 voltage levels, and establishes a communication path to local terminal 12. Local terminal 12 communicates with controller 10 via signal path 38, via isolation circuit 22 and transceiver 20. The output of buffer 32 is applied to modem 14 via signal path 40. Modem 14 communicates with controller 10 via signal path 42 through isolation circuit 22 and transceiver 20.

Buffers 30 and 32 are enabled via an enable signal present on either signal line 44 or 46. The enable signal is generated by local terminal 12 through transceiver 36. The enable signal may comprise, for example, a high or low signal. Switch 16 may comprise buffers which are active low, such that when the enable signal on either signal lines 44 or 46 is low, the respective buffer 30 or 32 is enabled to provide an output. For example, when the enable signal is low on signal line 44, buffer 30 is enabled to provide a communication path between controller 10 and local terminal 12. When the enable signal on signal line 44 is low, the signal on line 46 is high such that buffer 32 is disabled and no communication path is established between controller 10 and modem 14. When the enable signal on signal line 44 is high the enable signal on signal line 46 is low and therefore a communication path is established between controller 10 via buffer 32 and modem 14. The enable signal generated by local terminal 12 will be either high on signal line 44 and low on signal line 46 or low on signal line 44 and high on signal line 46 to only enable one of buffers 30 and 32 so that only a single communication path is established between controller 10 and either local terminal 12 or modem 14.

It therefore can be seen that the present switching circuit provides for a high speed switching mechanism. Buffers 30 and 32 may comprise, for example, CMOS logic gates which may have a switching time of, for example, 30 nanoseconds which is a significant improvement in switching time over relays which may operate, at for example, three milliseconds. The present switching circuit further has low current consumption as compared to relay operation, and provides virtually noiseless switching. Further, the present switching circuit is economical and requires less physical space on a printed wiring board as compared to relays.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. In a telecommunications system having a controller, a local terminal, and a modem, a switch comprising:
   a first buffer having an input and an output, said input connected to the controller, and said output connected to the local terminal, said first buffer having an enabled state and a disabled state;
   a second buffer having an input and an output, said input connected to the controller, and said output connected to the modem, said second buffer having an enabled state and a disabled state; and
   said first and second buffers being connected to the local terminal for receiving an enable signal, such that upon receiving said enable signal, one of said buffers is enabled, such that when said first buffer is in said enabled state and said second buffer is in said disabled state, said first buffer provides a communication path from the controller to the local terminal, and when said first buffer is in said disabled state and said second buffer is in said enabled state, said second buffer provides a communication path from the controller to the modem.

2. A telecommunications system comprising:
   a controller adapted to be connected to a local terminal and a modem;
   a first buffer having an input and an output, said input connected to said controller, and said output connected to said local terminal, said first buffer having an enabled state and a disabled state;
   a second buffer having an input and an output, said input connected to said controller, and said output connected to said modem, said second buffer having an enabled state and a disabled state; and
   said first and second buffers being connected to said local terminal for receiving an enable signal, such that upon receiving said enable signal, one of said buffers is enabled, such that when said first buffer is in said enabled state and said second buffer is in said disabled state, said first buffer provides a communication path from said controller to said local terminal, and when said first buffer is in said disabled state and said second buffer is in said enabled state; said second buffer provides a communication path from said controller to said modem.

3. The system of claim 2 and further including an isolation circuit connected between said controller and said first and second buffers.

4. The system of claim 3 and further including a transceiver connected between said controller and said isolation circuit.

5. The system of claim 4 and further including a transceiver connected between said local terminal and said first and second buffer outputs.

6. A telecommunications system comprising:
   a controller adapted to be connected to a local terminal and a remote modem;
   a first tri-state buffer having an input and an output, said input connected to said controller, and said output connected to said local terminal, said first tri-state buffer having an enabled state and a disabled state;
   a second tri-state buffer having an input and an output, said input connected to said controller, and said output connected to said modem, said second tri-state buffer having an enabled state and a disabled state; and
   said first and second tri-state buffers being connected to said local terminal for receiving an enable signal, such that upon receiving said enable signal, one of said tri-state buffers is enabled, such that when said first tri-state buffer is in said enabled state and said second buffer is in said disabled state, said first tri-state buffer provides a communication path from said controller to the local terminal, and when said first tri-state buffer is in said disabled state and said second tri-state buffer is in said enabled state, said second tri-state buffer provides a communication path from said controller to said modem.

7. The system of claim 6 and further including an isolation circuit connected between said controller and said first and second tri-state buffers.

8. The system of claim 7 and further including a transceiver connected between said controller and said isolation circuit.

9. The system of claim 8 and further including a transceiver connected between said local terminal and said first and second tri-state buffer outputs.

* * * * *